United States Patent
Zhang et al.

(10) Patent No.: US 10,432,374 B2
(45) Date of Patent: Oct. 1, 2019

(54) REPORTING UPLINK CHANNEL FEEDBACK IN WIRELESS COMMUNICATIONS

(71) Applicant: QUALCOMM Incorporated, San Diego, CA (US)

(72) Inventors: Xiaoxia Zhang, San Diego, CA (US); Taesang Yoo, Riverside, CA (US); Juan Montojo, San Diego, CA (US); Zhifei Fan, San Diego, CA (US); Renqiu Wang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 15/621,257

(22) Filed: Jun. 13, 2017

(65) Prior Publication Data

US 2018/0167183 A1 Jun. 14, 2018

Related U.S. Application Data

(60) Provisional application No. 62/433,101, filed on Dec. 12, 2016.

(51) Int. Cl.

| | |
|---|---|
| *H04L 12/28* | (2006.01) |
| *H04L 5/00* | (2006.01) |
| *H04J 11/00* | (2006.01) |
| *H04L 1/16* | (2006.01) |
| *H04W 72/04* | (2009.01) |
| *H04B 7/0456* | (2017.01) |

(Continued)

(52) U.S. Cl.
CPC ......... *H04L 5/0048* (2013.01); *H04B 7/0456* (2013.01); *H04B 7/0639* (2013.01); *H04J 11/0023* (2013.01); *H04J 11/0079* (2013.01); *H04L 1/0027* (2013.01); *H04L 1/0031* (2013.01); *H04L 1/1671* (2013.01); *H04W 72/04* (2013.01); *H04L 5/0053* (2013.01)

(58) Field of Classification Search
CPC ....................................................... H04L 12/50
USPC ......................................................... 370/403
See application file for complete search history.

(56) References Cited

U.S. PATENT DOCUMENTS

| | | | |
|---|---|---|---|
| 2015/0098410 A1* | 4/2015 | Jongren | H04L 1/0026 370/329 |
| 2016/0353293 A1* | 12/2016 | Tsai | H04W 24/02 |

OTHER PUBLICATIONS

CATT: "Further Discussion on Non-Codebook based Transmission in UL", 3GPP Draft; R1-1702081, 3rd Generation Partnership Project (3GPP), Mobile Competence Centre; 650, Route Des Lucioles; F-06921 Sophia-Antipolis Cedex; France, vol. RAN WG1, No. Athens, Greece; 20170213-20170217 Feb. 7, 2017 (Feb. 7, 2017), XP051220995, Retrieved from the Internet: URL:http://www.3gpp.org/ftp/tsg_ran/WG1_RL1/TSGR1_88/Docs/ [retrieved on Feb. 7, 2017], 2 pages.

(Continued)

*Primary Examiner* — Dang T Ton
(74) *Attorney, Agent, or Firm* — Arent Fox LLP

(57) ABSTRACT

Aspects of the present disclosure describe receiving an indication of a covariance matrix from an access point, receiving downlink signaling from the access point, deriving, based at least in part on the covariance matrix or the downlink signaling, one or more precoders for uplink communications over an uplink channel, and indicating, based at least in part on the one or more precoders, uplink channel feedback to the access point.

30 Claims, 7 Drawing Sheets

(51) Int. Cl.
*H04B 7/06* (2006.01)
*H04L 1/00* (2006.01)

(56) References Cited

OTHER PUBLICATIONS

CATT: "Further Discussion on UL MIMO for NR MIMO", 3GPP Draft; R1-1611379 NR UL MIMO Final, 3rd Generation Partnership Project (3GPP), Mobile Competence Centre; 650, Route Des Lucioles; F-06921 Sophia-Antipolis Cedex; France, vol. RAN WG1, No. Reno, USA; 20161114-20161118 Nov. 13, 2016 (Nov. 13, 2016), XP051175360, Retrieved from the Internet: URL:http://www.3gpp.org/ftp/Meetings_3GPP_SYNC/RAN1/Docs/ [retrieved on Nov. 13, 2016], 2 pages.
International Search Report and Written Opinion—PCT/US2017/061698—ISA/EPO—dated Feb. 20, 2018. 19 pages.
Qualcomm Incorporated: "4 Rx CSI Requirements", 3GPP Draft; R4-151578 4 Rx CSI V2, 3rd Generation Partnership Project (3GPP), Mobile Competence Centre; 650, Route Des Lucioles; F-06921 Sophia-Antipolis Cedex; France, vol. RAN WG4, No. Rio de Janeiro, Brazil; 20150420-20150424 Apr. 18, 2015 (Apr. 18, 2015), XP050938826, Retrieved from the Internet: URL:http://www.3gpp.org/ftp/Meetings_3GPP_SYNC/RAN4/Docs/ [retrieved on Apr. 18, 2015], 4 pages.

* cited by examiner

REPORTING UPLINK CHANNEL FEEDBACK IN WIRELESS COMMUNICATIONS

CLAIM OF PRIORITY UNDER 35 U.S.C. § 119

The present application for patent claims priority to Provisional Application No. 62/433,101, entitled "REPORTING UPLINK CHANNEL FEEDBACK IN WIRELESS COMMUNICATIONS" filed Dec. 12, 2016, which is assigned to the assignee hereof and hereby expressly incorporated by reference herein for all purposes.

BACKGROUND

Aspects of the present disclosure relate generally to wireless communication systems, and more particularly, to wireless communication systems for reporting uplink channel feedback.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. Some technologies utilize time division duplexing (TDD) for communicating using either downlink or uplink communications in a given period of time. In TDD, channel reciprocity can be used to obtain a channel. In channel reciprocity, for example, an access point can obtain a downlink channel via uplink signaling, such as sounding reference signals (SRS). In another example, using channel reciprocity, a user equipment (UE) can obtain an uplink channel via downlink signaling, such as channel state information reference signal (CSI-RS), etc. Moreover, an access point can derive a precoding matrix indicator (PMI) for downlink transmissions based on the uplink signaling (and/or feedback) from the UE and can provide the PMI or a precoder to the UE for performing uplink precoding.

The access point can provide the precoder to the UE by transmitting a precoded downlink CSI-RS. Due to channel estimation error (e.g., based on channel noise), however, the channel measured by the UE in the downlink may be different than the channel estimated by the access point in the uplink. Thus, the uplink precoder derived from the precoded CSI-RS may suffer from the channel estimation noise seen on the downlink and the uplink, and thus may not be effective for precoding transmissions to the access point. For example, singular value decomposition (SVD)-based precoding, which may be used by UEs in precoding transmissions for an access point, may be sensitive to such noise.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes receiving an indication of a covariance matrix from an access point where the covariance matrix is on the noise and interference experienced on the access point, receiving downlink signaling from the access point, deriving, based at least in part on the covariance matrix or the downlink signaling, one or more precoders for uplink communications over an uplink channel, and indicating, based at least in part on the one or more precoders, uplink channel feedback to the access point.

In another example, a method for wireless communication is provided including receiving an indication of uplink channel feedback from a user equipment (UE), where the uplink channel feedback corresponds to one or more downlink signals transmitted to the UE, determining, based on the uplink channel feedback, whether to specify one or more precoders for the UE or allow the UE to autonomously determine the one or more precoders, and indicating, to the UE, whether to use the one or more precoders or to autonomously determine the one or more precoders.

In yet another example, an apparatus for wireless communication is provided that includes a transceiver for communicating one or more wireless signals via one or more antennas, a memory configured to store instructions, and one or more processors communicatively coupled with the transceiver and the memory. The one or more processors are configured to receive an indication of a covariance matrix from an access point, wherein the covariance matrix is on noise and interference experienced on the access point, receive downlink signaling from the access point, derive, based at least in part on the covariance matrix or the downlink signaling, one or more precoders for uplink communications over an uplink channel, and indicate, based at least in part on the one or more precoders, uplink channel feedback to the access point.

In another example, an apparatus for wireless communication is provided that includes a transceiver for communicating one or more wireless signals via one or more antennas, a memory configured to store instructions, and one or more processors communicatively coupled with the transceiver and the memory. The one or more processors are configured to receive an indication of uplink channel feedback from a UE, wherein the uplink channel feedback corresponds to one or more downlink signals transmitted to the UE, determine, based on the uplink channel feedback, whether to specify one or more precoders for the UE or allow the UE to autonomously determine the one or more precoders, and indicate, to the UE, whether to use the one or more precoders or to autonomously determine the one or more precoders.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
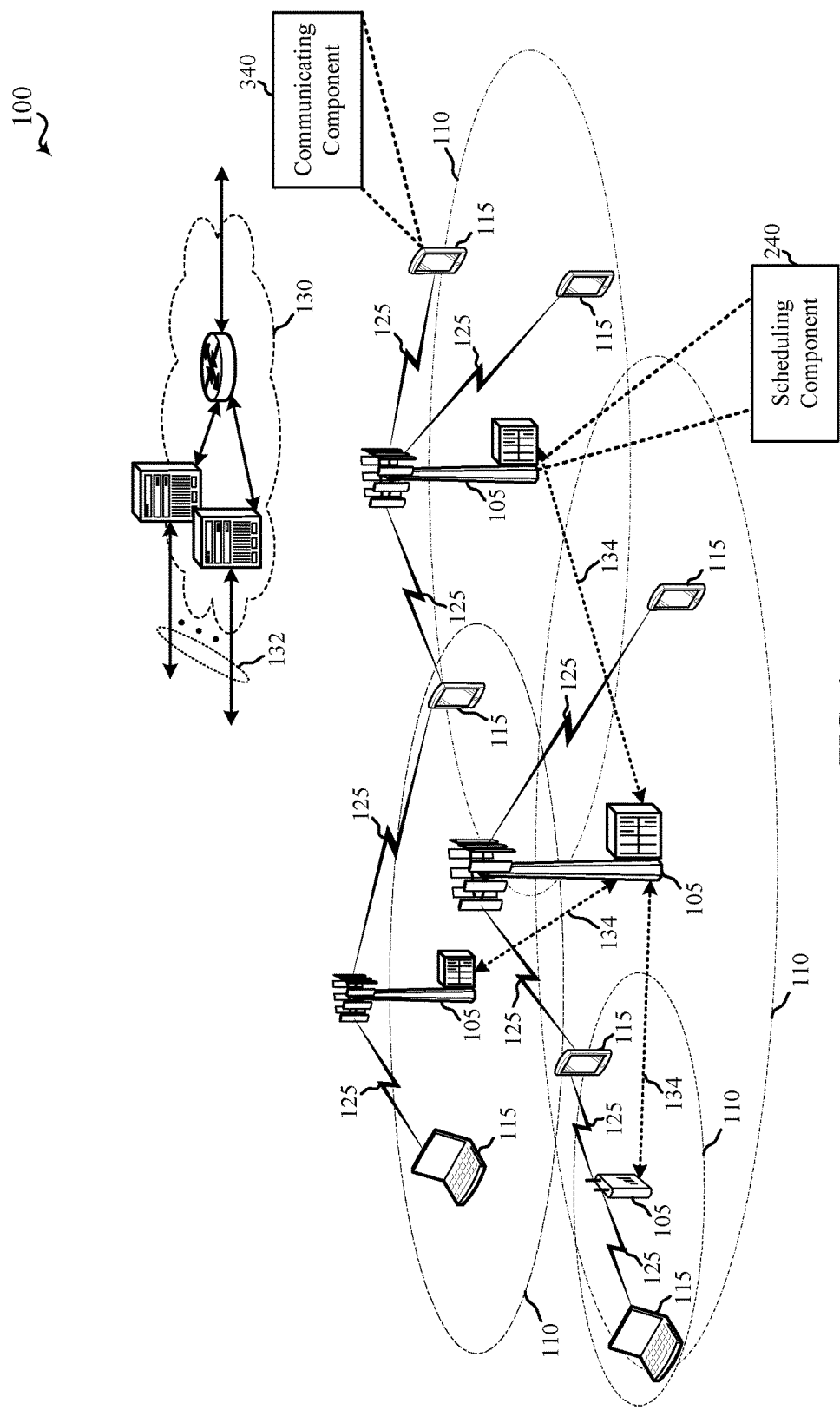
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to reporting uplink channel feedback in wireless communications, where the uplink feedback may be used to determine a precoder for precoding communications transmitted over an uplink channel. For example, a user equipment (UE) can determine uplink channel feedback based on channel reciprocity with a downlink channel (e.g., in time division duplexing (TDD) communications). In one example, the UE can obtain the uplink channel based on downlink signaling (e.g., downlink channel state information reference signal (CSI-RS). The UE can accordingly transmit uplink channel feedback related to the uplink channel to an access point. For example, the uplink channel feedback may include a modulation and coding scheme (MCS), precoding matrix indicator (PMI), etc. that the UE intends to use in transmitting communications over the uplink channel.

In addition, the access point can determine and indicate, to the UE, whether the UE is to derive a precoder or use a certain precoder. In one example, the indication may be based on the uplink channel feedback received from the UE. In another example, the UE can receive an indication of a covariance matrix from an access point, where the covariance matrix indicates noise and interference experienced at the access point over the downlink channel (or uplink channel in channel reciprocity). In this example, the UE can derive a precoder for precoding uplink communications based on the noise and interference covariance matrix and/or on channel reciprocity from downlink signaling from the access point. In one example, the UE may indicate the channel feedback based on the derived precoder. In another example, based on the uplink channel feedback, the access point can specify, to the UE, whether to derive (or continue to derive for a period of time) the precoder or use a specified precoder in precoding uplink communications (e.g., based on whether the uplink channel feedback indicates an undesirable or unexpected MCS, PMI, etc.).

In an example, the UE can utilize the derived or specified precoder for precoding uplink communications over a data channel, control channel, random access channel (RACH), etc. Moreover, in one example, the UE can determine different precoders for different resource elements, resource blocks, physical resource blocks, etc. based on the noise and interference covariance matrix and channel reciprocity based on corresponding downlink signaling. In any case, the UE can derive the precoder in some instances to conserve signaling used where the access point otherwise indicates the precoder. In other instances, the access point may specify whether to allow the UE to derive the precoder so the access point can retain the ability to specify the precoder (e.g., where the uplink channel feedback is undesirable or unexpected based on the channel estimated by the access point).

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE), LTE-Advanced (LTE-A) are releases of UMTS that use E-UTRA. New Radio (NR) is a new release of UMTS. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., NR or LTE) communications over a shared radio frequency spectrum band. The techniques described herein are applicable to any next generation communications systems including 5th Generation (5G)/NR or LTE/LTE-A applications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more access points, such as base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), gNodeB (gNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). Additionally, the plurality of base stations 105 may operate according to different ones of a plurality of communication technologies (e.g., 5G, fourth generation (4G)/LTE, 3G, Wi-Fi, Bluetooth, etc.), and thus there may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB) may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use hybrid automatic repeat/request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, an appliance, an automobile, any other suitable "Internet of Things" (IoT) device, or the like. A UE may be able to communicate with various types of base stations and network equipment including macro eNBs, small cell eNBs, macro gNBs, small cell gNBs, relay base stations, and the like.

The wireless communication links 125 shown in wireless communication system 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each wireless communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The wireless communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers. Moreover, in some aspects, the wireless communication links 135 may represent one or more broadcast channels.

In aspects of the wireless communication system 100, base station 105 may include a scheduling component 240 for scheduling one or more UEs 115 for communicating with the base station 105, which can include transmitting downlink communications from the base station 105 and/or receiving uplink communications from the UE 115. For example, scheduling component 240 may transmit a covariance matrix, where the covariance matrix is on the noise and interference experienced on the access point (e.g., base station 105), and/or downlink signaling to the UE 115 and/or may receive uplink channel feedback that is based on the covariance matrix and/or an uplink channel determined, by the UE 115, based on channel reciprocity corresponding to the downlink signaling. The scheduling component 240, in an example, can indicate to the UE 115 whether to derive a precoder or use a specific precoder based at least in part on the uplink channel feedback received from the UE 115.

In an example, the UE 115 may include a communicating component 340 for communicating with the base station 105. For example, communicating component 340 can receive the covariance matrix, where the covariance matrix is on the noise and interference experienced on the access point (e.g., base station 105), and/or downlink signaling from the base station 105. In this example, communicating component 340 can determine one or more precoders based on the covariance matrix and/or downlink signaling. For example, communicating component 340 can transmit uplink channel feedback to the base station 105, such as MCS, PMI, etc., based on the determined precoder. In one example, communicating component 340 may receive an indication of whether to derive a precoder or use a specific precoder signaled from base station 105, and can accordingly use the derived or specific precoder in precoding uplink communications for transmitting to the base station 105. Accordingly, the base station 105 can determine when the uplink channel feedback is in a state such that the UE 115 can derive the precoder instead of using signaling resources to signal the precoder from the base station 105.

Figure 2:
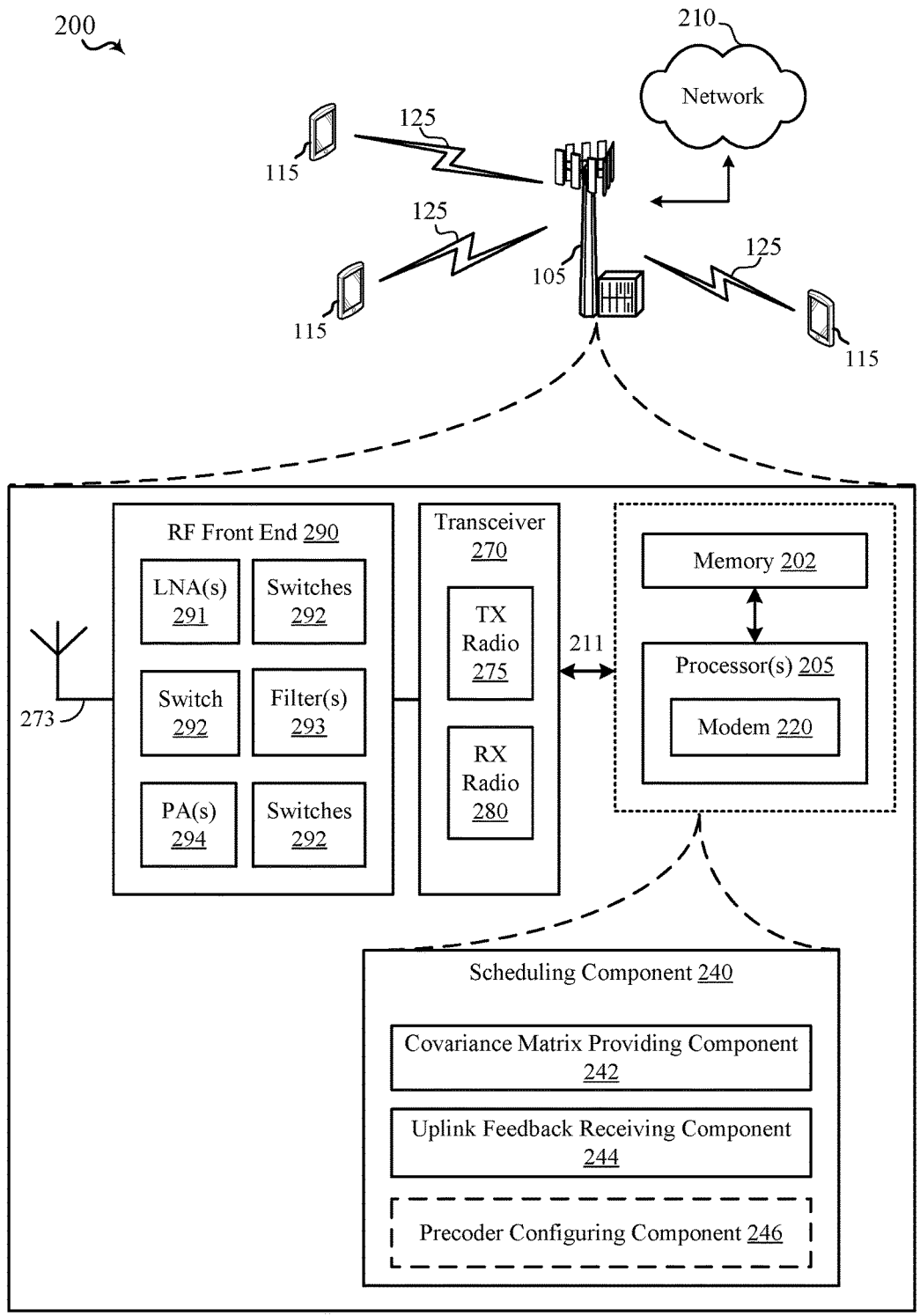
FIG. 2 is a block diagram illustrating an example of a base station, in accordance with various aspects of the present disclosure.
Figure 3:
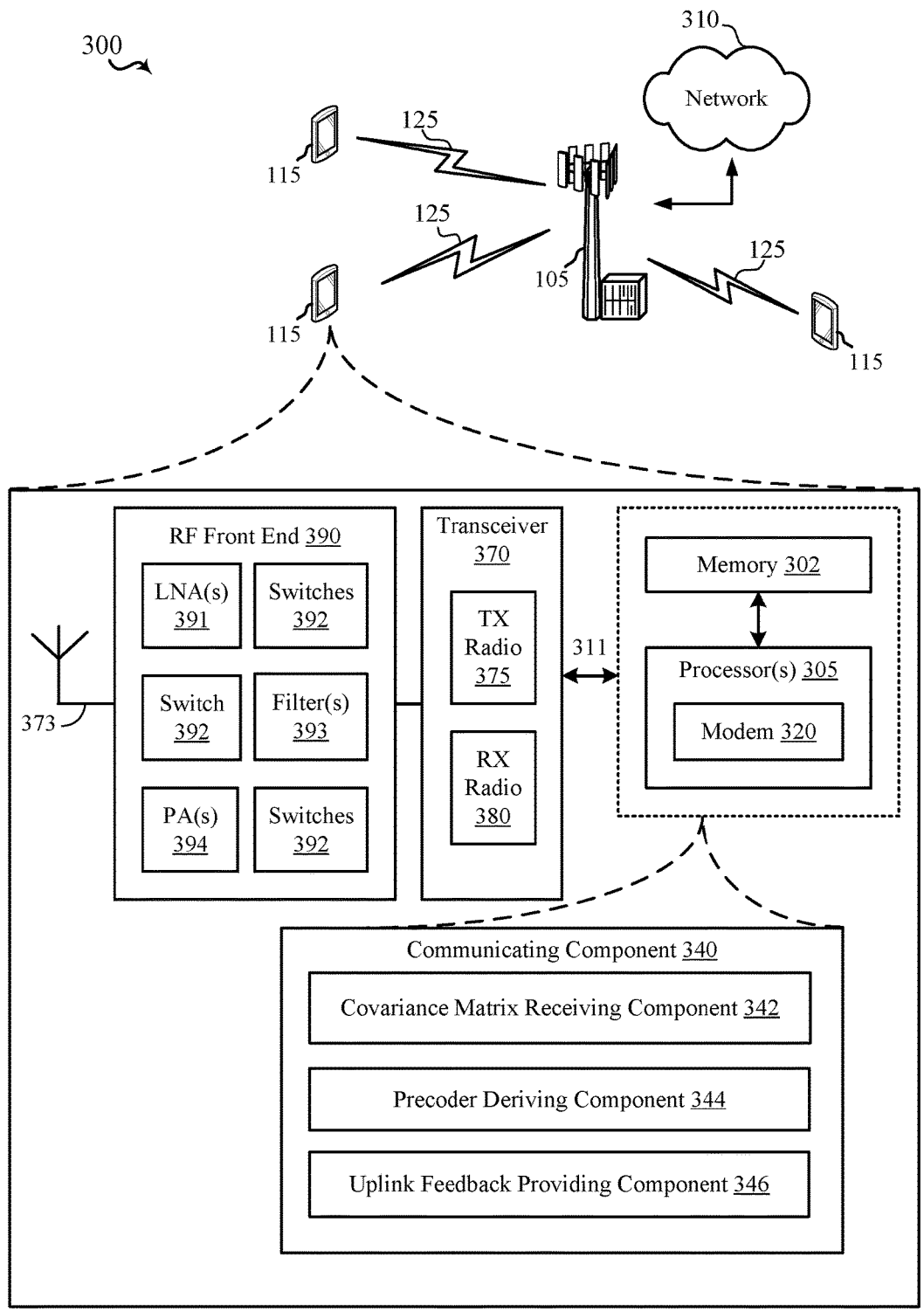
FIG. 3 is a block diagram illustrating an example of a UE, in accordance with various aspects of the present disclosure.
Figure 4:
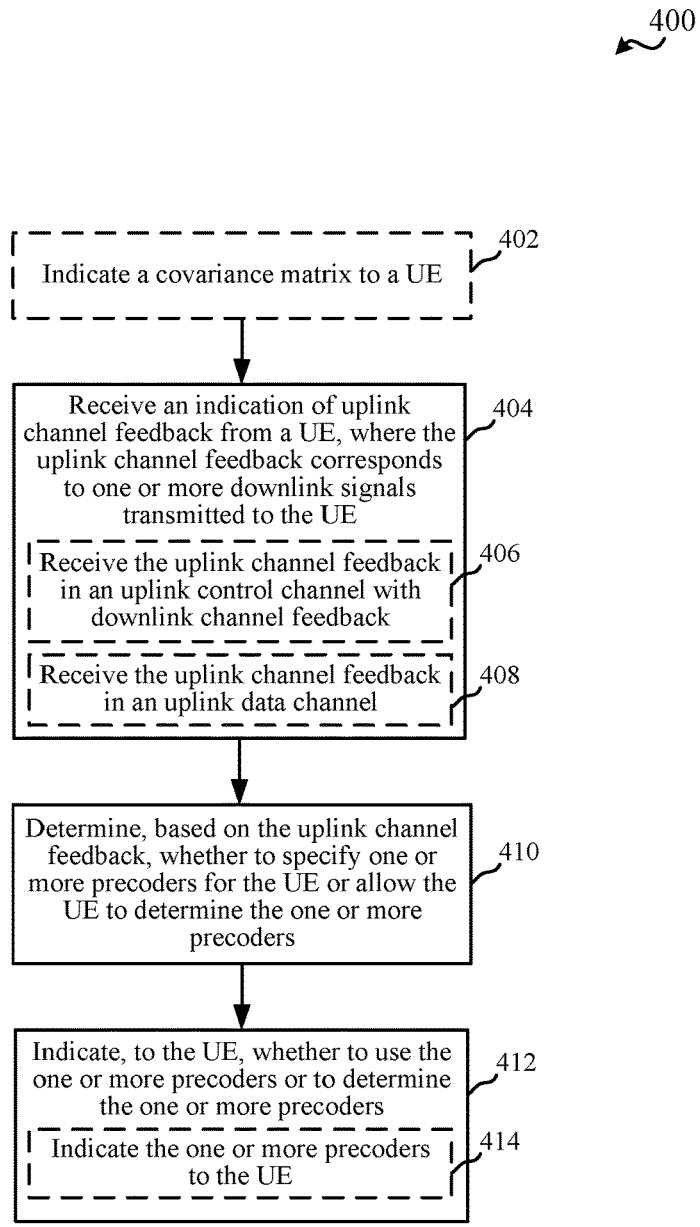
FIG. 4 is a flow chart illustrating an example of a method for receiving uplink channel feedback, in accordance with various aspects of the present disclosure.
Figure 5:
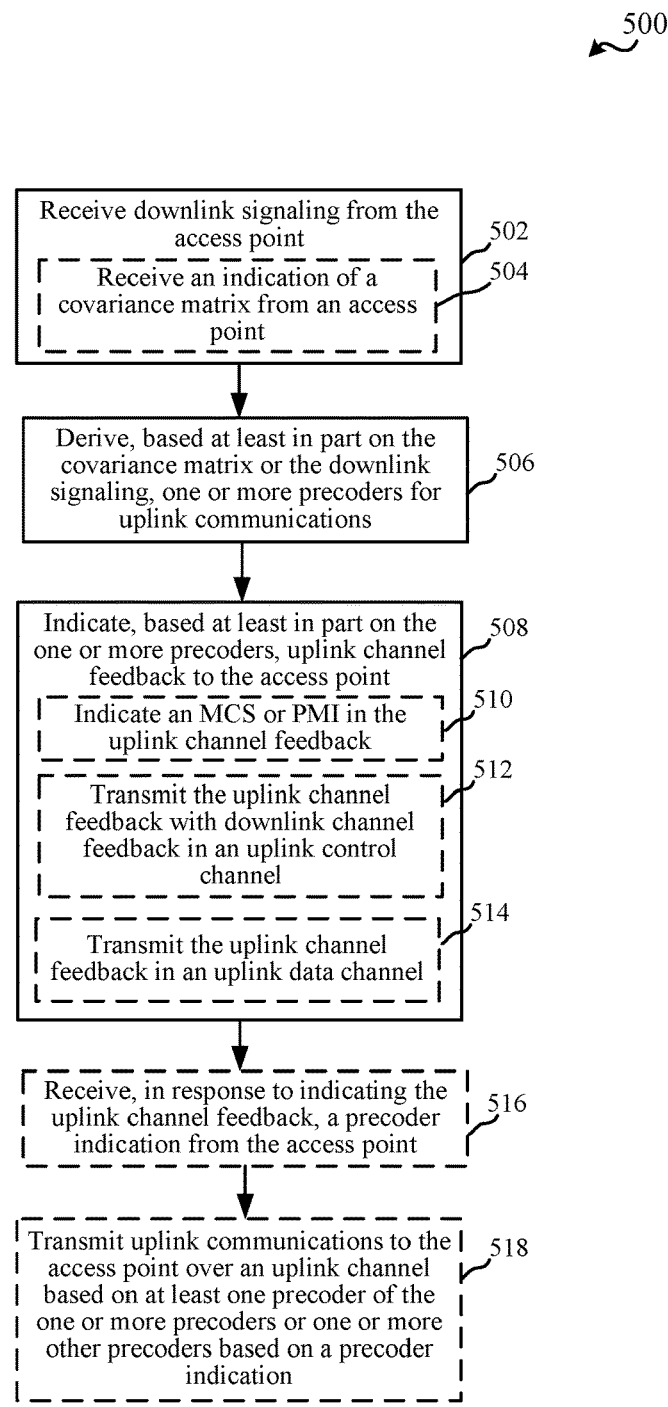
FIG. 5 is a flow chart illustrating an example of a method for indicating uplink channel feedback, in accordance with various aspects of the present disclosure.
Figure 6:
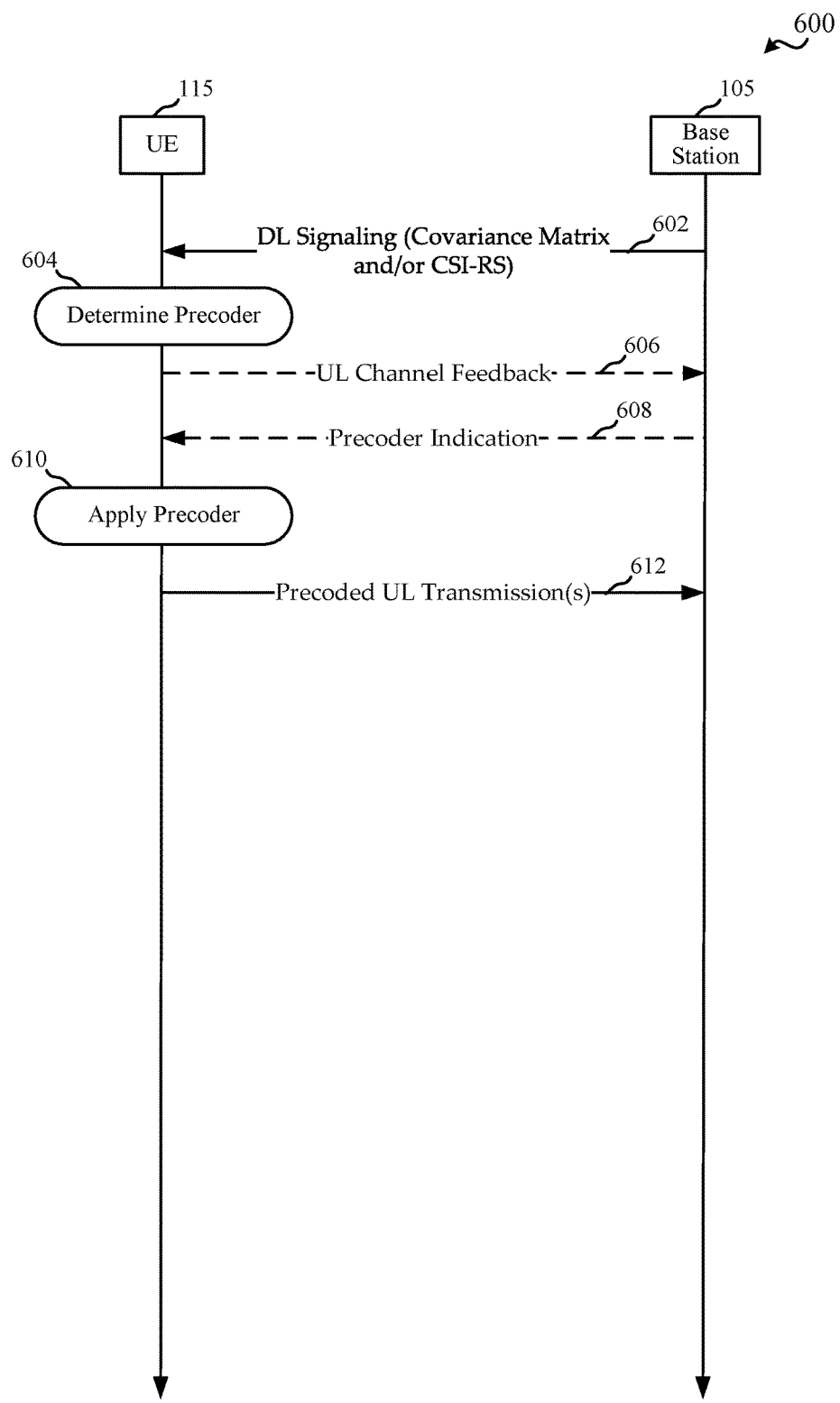
FIG. 6 is a block diagram illustrating an example of a system for indicating uplink channel feedback, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, a block diagram 200 is shown that includes a portion of a wireless communications system having multiple UEs 115 in communication with a base station 105 via wireless communication links 125, where the base station 105 is also connected to a network 210. The UEs 115 may be examples of the UEs described in the present disclosure that are configured to provide uplink channel feedback to one or more base stations 105. Moreover the base station 105 may be an example of the base stations described in the present disclosure that are configured to receive uplink channel feedback from the one or more UEs 115.

In an aspect, the base station in FIG. 2 may include one or more processors 205 and/or memory 202 that may operate in combination with a scheduling component 240 to perform the functions, methodologies (e.g., method 400 of FIG. 4), or other methods presented in the present disclosure. In accordance with the present disclosure, the scheduling component 240 may include a covariance matrix providing component 242 for providing a covariance matrix to one or more UEs 115, an uplink feedback receiving component 244 for receiving, from one or more UEs 115, feedback corresponding to an uplink channel, and/or an optional precoder configuring component 246 for configuring the one or more UEs 115 to derive precoders or utilize one or more specific precoders in precoding uplink communications for transmission to the base station 105.

The one or more processors 205 may include a modem 220 that uses one or more modem processors. The various functions related to the scheduling component 240, and/or its sub-components, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, a baseband processor, a digital signal processor, a transmit processor, a transceiver processor associated with transceiver 270, a system-on-chip (SoC), etc. In particular, the one or more processors 205 may execute functions and components included in the scheduling component 240.

In some examples, the scheduling component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to transmit messages generated by the scheduling component 240 to the UEs. RF front end 290 may be connected to one or more antennas 273 and can include one or more switches 292, one or more amplifiers (e.g., power amplifiers (PAs) 294 and/or low-noise amplifiers 291), one or more filters 293, etc. for transmitting and receiving RF signals on uplink channels and downlink channels. In an aspect, the components of the RF front end 290 can connect with transceiver 270. The transceiver 270 may connect to one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or scheduling component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining scheduling component 240 and/or one or more of its sub-components. Additionally or alternatively, the base station 105 may include a bus 211 for coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 7. Similarly, the memory 202 may correspond to the memory described in connection with the base station in FIG. 7.

Referring to FIG. 3, a block diagram 300 is shown that includes a portion of a wireless communications system having multiple UEs 115 in communication with a base station 105 via wireless communication links 125, where the base station 105 is also connected to a network 310. The UEs 115 may be examples of the UEs described in the present disclosure that are configured to provide uplink channel feedback to one or more base stations 105. Moreover the base station 105 may be an example of the base stations described in the present disclosure that are configured to receive uplink channel feedback from the one or more UEs 115.

In an aspect, the UE 115 in FIG. 3 may include one or more processors 305 and/or memory 302 that may operate in combination with a communicating component 340 to perform the functions, methodologies (e.g., method 500 of FIG. 5), or other methods presented in the present disclosure. In accordance with the present disclosure, the communicating component 340 may include a covariance matrix receiving component 342 for receiving a covariance matrix from the base station 105, a precoder deriving component 344 for determining a precoder for uplink communications based at least in part on the covariance matrix and/or downlink signaling from the base station 105, and an uplink feedback providing component 346 for providing uplink feedback to the base station 105, which may be based on the determined precoder and/or the downlink signaling from the base station 105 (e.g., based on uplink channel reciprocity).

The one or more processors 305 may include a modem 320 that uses one or more modem processors. The various functions related to the communicating component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, a baseband processor, a digital signal processor, a transmit processor, a transceiver processor associated with transceiver 370, a system-on-chip (SoC), etc. In particular, the one or more processors 305 may execute functions and components included in the communicating component 340.

In some examples, the communicating component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to receive signals to be processed by the communicating component 340. RF front end 390 may be connected to one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can connect with transceiver 370. The transceiver 370 may connect to one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or communicating component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining communicating component 340 and/or one or more of its sub-components. Additionally or alternatively, the UE 115 may include a bus 311 for coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 7. Similarly, the memory 302 may correspond to the memory described in connection with the UE in FIG. 7.

In certain aspects, UEs 115 can perform channel reciprocity to obtain an uplink channel based on downlink signaling, and/or base stations 105 can similarly perform channel reciprocity to obtain a downlink channel based on uplink signaling, which can reduce feedback overhead typically associated with obtaining the channels. For example, a base station can derive PMI for precoding downlink transmissions over a channel based on uplink signaling/feedback over the channel, and thus may not need to signal PMI information with demodulation reference signal (DMRS)-based downlink transmission modes to the UE(s). Similarly, the UE may not need to obtain explicit PMI information for demodulating downlink transmissions from the base station over the channel.

In another example, the UE may obtain the PMI information from the base station to accordingly perform uplink precoding. Moreover, for uplink communications, the base station can obtain the uplink channel via uplink signaling (e.g., SRS), and can derive uplink precoding based on the uplink channel, interference, and noise experienced on the base station receiver. The base station can convey the precoder to the UE (e.g., the eNB can explicitly signal the PMI in an uplink grant to the UE, and/or with frequency selective precoding in the uplink, the base station can signal PMI for each of a plurality of sub-bands). In one example, the base station can signal the uplink frequency selected unquantized precoding via a precoded downlink CSI-RS.

In an example, the base station can receive an uplink signal on a k-th subcarrier as:

$$y[k]=H_u[k]x[k]+n[k]$$

where x[k] is the signal transmitted from UE, n[k] is the interference seen by base station with covariance matrix $R_{nn}$, and $H_u[k]$ is the UL channel on the k-th subcarrier. The base station can obtain whitened channel as:

$$\hat{H}_u[k]=R_{nn}^{-1/2}H_u[k]=U[k]\Lambda[k]V[k]^*.$$

Where $U[k]\Lambda[k]V[k]^*$ is the singular value decomposition of matrix $\hat{H}_u[k]$ or effectively the singular value decomposition of matrix $R_{nn}^{-1/2}H_u[k]$.

With channel reciprocity and substantially perfect calibration, $H_D[k]=(H_u[k])^T$. The base station can send precoded CSI-RS with $(U^*[k]R_{nn}^{-1/2})^T$. The downlink channel that the UE measures from precoded CSI-RS can be:

$$H_D[k](U^*[k]R_{nn}^{-1/2})^T=(U^*[k]R_{nn}^{-1/2}H_U[k])^T=(\Lambda[k]V[k]^*)^T=(V[k]^*)^T\Lambda[k]$$

The UE can thus obtain the uplink precoder V[k] from the precoded CSI-RS transmitted by the base station. However, there may be some issues with obtaining the uplink precoder from the precoded CSI-RS in this regard.

For example, with channel estimation error, the channel measured by UE in the downlink is $\hat{H}_D[k]=H_D[k]+N_1[k]$ while the channel estimated by base station in the uplink is $\hat{H}_U[k]=H_U[k]+N_2[k]$, where $N_1[k]$ and $N_2[k]$ may represent different noise levels. The channel reciprocity can hold for the true channel, but may not be as accurate for the estimated channel. In other words, $H_D[k]=(H_u[k])^T$, but $\hat{H}_D[k] \sim =(\hat{H}_u[k])^T$. The downlink channel the UE measures from precoded CSI-RS can be:

$$\hat{H}_D[k](U^*[k]R_{nn}^{-1/2})^T=(U^*[k]R_{nn}^{-1/2}H_U[k]+N_1[k])^T=(\Lambda[k]V[k]^*)^T+(U^*R_{nn}^{-1/2}n[k])^T=(V[k]^*)^T\Lambda[k]+(U^*R_{nn}^{-1/2}n[k])^T$$

This may imply that the uplink precoder V[k] derived from the precoded CSI-RS may suffer from the channel estimation noise seen on both the downlink and the uplink. In an example, a singular value decomposition (SVD) operation for precoding communications (e.g., by the UE) may be very sensitive to noise, and may thus yield undesirable results when based on the derived precoder V[k]. In addition, if the base station applies some precoding smoothing techniques to allow for continuous precoder, the exact algorithm may need to be specified for the UE to obtain the precoder. Furthermore, the precoded CSI-RS may need to be UE specific, which may imply a nontrivial overhead in the system in the presence of multiple UEs.

Thus, as described further herein for example, the UE 115 can obtain the UL precoder information based on communications from the base station 105 (e.g., based on the precoder derived from the precoded CSI-RS and/or based on a covariance matrix indicated by the base station 105). In this case, the UL precoder can be implicitly indicated from base station 105. Alternatively, the base station 105 may indicate the UL precoder via explicit signaling (for example, explicit PMI in a physical downlink control channel (PDCCH)). As yet another alternative, the UE may derive the UL precoder based on DL signaling where the DL signaling could be unprecoded CSI-RS as well as noise and interference covariance matrix or the DL signaling could be CSI-RS whitened by noise and interference covariance matrix where the whitening takes the noise and interference covariance matrix experienced by the eNB receiver into account. In addition, for example, the UE 115 can transmit the uplink channel feedback to the base station 105 and the base station 105 can indicate to the UE 115 whether to use the derived precoder (and/or whether to subsequently derive precoders) or whether to use the precoder indicated by the base station 105 where the precoder indication from eNB could be either implicit via precoded CSI-RS signaling, explicitly conveyed in the PDCCH, etc.

FIG. 4 illustrates a flow chart of an example of a method 400 for receiving and processing (e.g., by a base station) uplink channel feedback.

At Block 402, method 400 may optionally include indicating a covariance matrix to a UE. In an aspect, covariance matrix providing component 242, e.g., in conjunction with processor(s) 205, memory 202, transceiver 270, scheduling component 240, etc. can indicate the covariance matrix to the UE 115. In an aspect, covariance matrix providing component 242 can generate the covariance matrix (e.g., $R_{nn}$, in the formulas above) based on the noise and interference experienced on the base station receiver (e.g., at transceiver 270 or a portion thereof). Covariance matrix providing component 242 can then, for example, transmit the covariance matrix to one or more UEs 115 over at least one of a dedicated channel (e.g., physical downlink control channel (PDCCH), physical downlink shared channel (PDSCH), etc.), a random access channel, etc. In another example, covariance matrix providing component 242 can transmit the covariance matrix by precoding a CSI-RS based on the covariance matrix. For example, covariance matrix providing component 242 can precode the CSI-RS using a whitening matrix from the covariance matrix to account for noise and interference based on the covariance matrix, and can transmit the precoded CSI-RS to the UE 115. That is, instead of transmitting unprecoded CSI-RS which allows UE 115 to measure $H_u[k]$, the covariance matrix providing component 242 can precode the CSI-RS with $R_{nn}^{-1/2}$ such that UE 115 can estimate the whitened UL channel with respect to the covariance matrix experienced at base station (e.g., gNB) receiver, e.g., $R_{nn}^{-1/2}H_u[k]^*$.

At Block 404, method 400 includes receiving an indication of uplink channel feedback from a UE, where the uplink channel feedback corresponds to one or more downlink signals transmitted to the UE. In an aspect, uplink feedback receiving component 244, e.g., in conjunction with processor(s) 205, memory 202, transceiver 270, scheduling component 240, etc. can receive an indication of uplink channel feedback from the UE 115, where the uplink channel feedback corresponds to one or more downlink signals transmitted to the UE 115 by the base station 105. For example, the one or more downlink signals can correspond to a reference signal, such as a common reference signal (CRS) or CSI-RS, etc., a signal used to transmit a covariance matrix at optional Block 402, and/or substantially any downlink signal from the base station 105. In an example, the uplink channel feedback can correspond to CSI or other feedback related to an uplink channel based on channel reciprocity with the downlink channel.

For example, channel reciprocity, as used herein, can relate to the concept that links operating on a same or similar frequency band may have similar impulse response regardless of direction. Thus, in channel reciprocity, the impulse response observed in signaling on the downlink can be assumed to be the same for determining an uplink channel (e.g., where the channel is configured in TDD for downlink communications in some time periods and uplink communications in others). Similarly, in an example, in channel reciprocity, the impulse response observed in signaling on the uplink can be assumed to be the same for determining a downlink channel. Accordingly, as described further herein, the UE 115 can determine CSI feedback for an uplink channel based on impulse response or other properties of the downlink signaling (e.g., the CSI-RS from base station 105) that are assumed to be the same or similar for the uplink channel. In addition, the UE 115 can determine the CSI feedback based on a covariance matrix received from the base station 105. The CSI feedback received by uplink feedback receiving component 244 from the UE 115 may include a MCS, PMI, etc. determined for a precoder derived from the covariance matrix and/or downlink signaling of the base station 105, where the UE 115 may use (or plan to use) the MCS, PMI, etc. in transmitting uplink communications to the base station 105.

In one example, receiving the indication of uplink channel feedback at Block 404 may optionally include, at Block 406, receiving the uplink channel feedback in an uplink control channel with downlink channel feedback. In an aspect, uplink feedback receiving component 244, e.g., in conjunction with processor(s) 205, memory 202, transceiver 270, scheduling component 240, etc. can receive the uplink channel feedback in the uplink control channel with downlink channel feedback. For example, the UE 115 can transmit, and the uplink feedback receiving component 244 can receive, the uplink channel feedback in a physical uplink control channel (PUCCH) or other control channel along with (or without) downlink channel feedback (e.g., CSI or other feedback for one or more downlink channels transmitted by the base station 105 to the UE 115).

In another example, receiving the indication of uplink channel feedback at Block 404 may optionally include, at Block 408, receiving the uplink channel feedback in an uplink data channel. In an aspect, uplink feedback receiving component 244, e.g., in conjunction with processor(s) 205, memory 202, transceiver 270, scheduling component 240, etc. can receive the uplink channel feedback in the uplink data channel. For example, the uplink data channel may include a physical uplink shared channel (PUSCH) allocated by the base station 105 to one or more UEs 115, and the UE 115 can transmit the uplink channel feedback (e.g., along with uplink data or otherwise) over the uplink data channel.

At Block 410, method 400 includes determining, based on the uplink channel feedback, whether to specify one or more precoders for the UE or allow the UE to determine the one or more precoders. In an aspect, precoder configuring component 246, e.g., in conjunction with processor(s) 205, memory 202, transceiver 270, scheduling component 240, etc. can determine, based on the uplink channel feedback, whether to specify one or more precoders for the UE 115 or allow the UE 115 to determine the one or more precoders. For example, precoder configuring component 246 can compare the uplink channel feedback to one or more thresholds or parameters determined for the uplink channel by the base station 105, and can determine whether to specify one or more precoders for the UE or allow the UE to autonomously determine the one or more precoders based on the comparison. In a specific example, the uplink channel feedback may include a PMI, MCS, etc. determined based on a derived precoder, as described. Thus, for example, precoder configuring component 246 can determine whether to specify one or more precoders for the UE or allow the UE to autonomously determine the one or more precoders based on comparing the PMI, MCS, etc. indicated in uplink feedback in uplink control or data channel, to a PMI, MCS, etc. determined by the base station 105, and/or the like. For example, precoder configuring component 246 can determine to specify a precoder for certain PMI and/or MCS values while allowing the UE 115 to determine the precoder for other PMI and/or MCS values.

At Block 412, method 400 includes indicating, to the UE, whether to use the one or more precoders or to determine the one or more precoders. In an aspect, precoder configuring component 246, e.g., in conjunction with processor(s) 205, memory 202, transceiver 270, scheduling component 240, etc. can indicate, to the UE 115, whether to use the one or more precoders (e.g., as specified by the base station 105) or to determine the one or more precoders (e.g., autonomously by the UE 115 based on covariance matrices, downlink signaling, etc.). For example, precoder configuring component 246 may indicate, to the UE 115, whether to use the one or more precoders or whether to determine the one or more precoders via an indicator transmitted in an uplink grant to the UE 115, transmitted in radio resource control (RRC) signaling, and/or the like.

In one example, indicating at Block 412 may optionally include, at Block 414, indicating the one or more precoders to the UE. In an aspect, precoder configuring component 246, e.g., in conjunction with processor(s) 205, memory 202, transceiver 270, scheduling component 240, etc. can indicate the one or more precoders to the UE 115, such that the UE 115 can obtain the one or more precoders and utilize the one or more precoders in precoding uplink communications for the base station 105. In this regard, for example, where the precoder configuring component 246 indicates one or more precoders, the UE 115 can determine to utilize the one or more precoders indicated instead of a derived precoder, as described further herein. For example, precoder configuring component 246 can indicate the one or more precoders as one or more precoding matrices or other corresponding parameters from which the precoder can be determined and/or applied by the UE 115.

FIG. 5 illustrates a flow chart of an example of a method 500 for generating and communicating (e.g., by a UE) uplink channel feedback corresponding to an uplink channel.

At Block 502, method 500 includes receiving downlink signaling from the access point. In an aspect, communicating component 340, e.g., in conjunction with processor(s) 305, memory 302, and/or transceiver 370, can receive the downlink signaling from the access point (e.g., from base station 105). In an example, the downlink signaling may correspond to one or more reference signals (e.g., CSI-RS, CRS, etc.), one or more signals over which a covariance matrix is received by covariance matrix receiving component 342, or substantially any downlink signaling that can be used with channel reciprocity to obtain an uplink channel, etc.

In one example, receiving the downlink signaling from the access point may include, at Block 504, receiving an indication of a covariance matrix from an access point. In an aspect, covariance matrix receiving component 342, e.g., in conjunction with processor(s) 305, memory 302, communicating component 340, and/or transceiver 370, can receive the indication of the covariance matrix from the access point (e.g., base station 105), which may include receiving the indication as part of the downlink signaling or separate from the downlink signaling. As described, for example, the base station 105 may generate the covariance matrix based on the noise and interference experienced at the base station receiver (e.g., transceiver 270) over the downlink and/or uplink channel. This example allows multiple UEs to use the CSI-RS, which may be unprecoded, while the covariance matrix can be signaled to each UE. Additionally, covariance matrix receiving component 342 may receive the covariance matrix from the base station 105 in an uplink grant, in a RRC message, etc. In another example, covariance matrix receiving component 342 may receive a CSI-RS from the base station 105, where the CSI-RS is precoded based on the covariance matrix (e.g., precoded with a whitening matrix from the covariance matrix), and since the CSI-RS is precoded with respect to the covariance matrix, UE 115 can measure the whitened channel from the precoded CSI-RS and UE 115 may not need to determine the covariance matrix (e.g., the covariance matrix becomes identity matrix since base station, e.g., gNB, already whitens the channel).

At Block 506, method 500 includes deriving, based at least in part on the covariance matrix or the downlink signaling, one or more precoders for uplink communications. In an aspect, precoder deriving component 344, e.g., in conjunction with processor(s) 305, memory 302, communicating component 340, and/or transceiver 370, can derive, based at least in part on the covariance matrix or the downlink signaling, one or more precoders for uplink communications. For example, precoder deriving component 344 may measure the downlink channel from the downlink signaling from the base station 105 as:

$$H_D[k](U^*[k]R_{nn}^{-1/2})^T = (U^*[k]R_{nn}^{-1/2}H_U[k])^T = (\Lambda[k]V[k]^*)^T = (V[k]^*)^T \Lambda[k]$$

In addition, precoder deriving component 344 may obtain an uplink channel based on channel reciprocity with the downlink signaling. Precoder deriving component 344 may accordingly obtain the uplink precoder V[k], which can be determined based on using the covariance matrix as $R_{nn}$ in the above formula, or a similar formula, for determining the downlink signaling/corresponding uplink channel. In another example, precoder deriving component 344 may apply precoding smoothing techniques, such as incremental SVD, sub-band SVD, etc., to obtain the precoder (e.g., based on the formula above). For example, this can allow for continuous precoding of uplink transmissions where the continuous precoding can be over the entire frequency band for the uplink channel or over a sub-band thereof.

At Block 508, method 500 includes indicating, based at least in part on the one or more precoders, uplink channel feedback to the access point. In an aspect, uplink feedback providing component 346, e.g., in conjunction with processor(s) 305, memory 302, communicating component 340, and/or transceiver 370, can indicate, based at least in part on the one or more precoders, uplink channel feedback to the access point (e.g., base station 105). In an example, the uplink channel feedback may relate to the uplink channel with the base station 105. For example, the uplink channel feedback may include a MCS, PMI, etc., which can be determined for the uplink channel based on the derived precoder. In this case, for example, the UE can derive the precoder based on DL signaling such as CSI-RS and channel reciprocity to obtain uplink channel and/or the noise and interference covariance matrix experienced on the base station receiver (e.g., transceiver 270) and can accordingly obtain the corresponding MCS and PMI and feedback to the base station 105.

Thus, for example, indicating the uplink channel feedback at Block 508 may optionally include, at Block 510, indicating an MCS or PMI in the uplink channel feedback. In an aspect, uplink feedback providing component 346, e.g., in conjunction with processor(s) 305, memory 302, communicating component 340, and/or transceiver 370, can indicate the MCS or PMI in the uplink channel feedback. In an example, the MCS, PMI, etc. may be of a large sub-band granularity (e.g., larger than a granularity for MCS, PMI, etc. determined for the uplink data transmission (e.g., over PUSCH)), as the MCS, PMI, etc. in the uplink channel feedback can be used for confirmation between the UE 115 and the base station 105 as to which MCS, PMI, etc. is to be used on the uplink channel. In another example, the UE 115 may use continuous precoding for actual uplink transmission over the uplink channel (e.g., over PUSCH), as described further herein, where the continuous precoding may be different than the PMI reported to the base station 105 in the uplink channel feedback. In addition, for example, the base station 105 may determine the MCS based at least on channel and noise variance detected in the bandwidth assigned for the downlink and uplink channels (e.g., detected based on uplink signals received from the UE 115).

In another example, indicating the uplink channel feedback at Block 508 may optionally include, at Block 512, transmitting the uplink channel feedback with downlink channel feedback in an uplink control channel. In an aspect, uplink feedback providing component 346, e.g., in conjunction with processor(s) 305, memory 302, communicating component 340, and/or transceiver 370, can transmit the uplink channel feedback along with downlink channel feedback in the uplink control channel (e.g., PUCCH). For example, uplink feedback providing component 346 can transmit the uplink channel feedback with downlink channel feedback such as CSI feedback for a downlink channel (e.g., PDSCH, etc.) from the base station 105. Thus, for example, uplink feedback providing component 346 can at least one of multiplex the uplink channel feedback and the downlink channel feedback, jointly encode the uplink channel feedback and the downlink channel feedback for transmitting over the uplink feedback channel, etc. In another example, uplink feedback providing component 346 can transmit the uplink channel feedback separately from the downlink channel feedback over the uplink feedback channel.

In yet another example, indicating the uplink channel feedback at Block 508 may optionally include, at Block 514, transmitting the uplink channel feedback in an uplink data channel. In an aspect, uplink feedback providing component 346, e.g., in conjunction with processor(s) 305, memory 302, communicating component 340, and/or transceiver 370, can transmit the uplink channel feedback in the uplink data channel (e.g., PUSCH). For example, uplink feedback providing component 346 may provide the uplink channel feedback along with (e.g., multiplexed with) uplink data in the uplink data channel.

At Block 516, method 500 optionally includes receiving, in response to indicating the uplink channel feedback, a precoder indication from the access point. In an aspect, precoder deriving component 344, e.g., in conjunction with processor(s) 305, memory 302, communicating component 340, and/or transceiver 370, can receive, in response to indicating the uplink channel feedback, the precoder indication from the access point (e.g., base station 105). As described, the precoder indication may be received from the base station 105 in an uplink grant (e.g., corresponding to resources for a PUCCH, PUSCH, etc.), in RRC signaling, and/or the like. Moreover, as described, the precoder indication may indicate whether the UE 115 is to use a precoder specified by the base station 105, whether the UE 115 is to autonomously determine a precoder (e.g., as derived by precoder deriving component 344 at Block 506), an indication of a precoder for the UE 115 to use in precoding uplink communications as specified by the base station 105, etc. In any case, precoder deriving component 344 can determine which precoder to use based at least in part on the indication, as described.

At Block 518, method 500 optionally includes transmitting uplink communications to the access point over an uplink channel based on at least one precoder of the one or more precoders or one or more other precoders based on a precoder indication. In an aspect, communicating component 340, e.g., in conjunction with processor(s) 305, memory 302, and/or transceiver 370, can transmit uplink communications to the access point (e.g., base station 105) over an uplink channel based on at least one precoder of the one or more precoders (e.g., as derived by precoder deriving component 344) or one or more other precoders based on a precoder indication (e.g., where a precoder indication is received by precoder deriving component 344 from base station 105). In an example, the uplink communications can correspond to uplink data channel (e.g., PUSCH) communications, uplink control channel (e.g., PUCCH) communications, random access channel (e.g., RACH) communications, etc.

In a specific example, in LTE, an explicit transmit diversity scheme may not be applied to physical RACH (PRACH) transmission, and the UE could apply open loop transmit antenna selection transparent to the base station. In LTE, transparent open loop transmit antenna selection or spatial orthogonal resource transmit diversity (SORTD) may be applied to uplink control communications (e.g., PUCCH). In addition, in SORTD, different transmit antennas may use different PUCCH resources. In NR, cyclic delay diversity and precoder cycling may be used for PUCCH and/or PRACH. However, the above transmit diversity schemes are open loop schemes (i.e., the diversity scheme is not a function of uplink channel). With channel reciprocity, as described above, closed-loop transmit diversity scheme can be used for precoding communications over the UL control channel, at least in some cases.

Thus, for example, for PUCCH, the downlink signaling received by the communicating component 340 (e.g., at Block 502) may include CRS, CSI-RS, etc., and the communicating component 340 can measure the uplink channel based on channel reciprocity with the downlink signaling. In addition, the precoder deriving component 344 can determine the preferred precoding on the corresponding PUCCH resources based on the measured uplink channel. For example, in deriving the precoder, precoder deriving component 344 (e.g., at Block 506) may take the channel covariance matrix into account if available. In addition, for example, communicating component 340 can apply precoding smoothing techniques to facilitate continuous precoding to allow the base station 105 to perform wideband channel estimation. If the PUCCH uses orthogonal frequency division multiplexing (OFDM), communicating component 340 may apply different precoders on different resource elements, resource blocks, physical resource block groups, etc. in different time periods (e.g., different symbols) based on the measured uplink channel and/or on the covariance matrix. If the PUCCH uses single carrier frequency division multiplexing (SC-FDM), communicating component 340 may apply a single precoder on the PUCCH over various time periods (e.g., a number of symbols) based on the measured uplink channel and/or on the covariance matrix.

Moreover, for example, communicating component 340 may determine whether to switch to an open loop diversity scheme if it outperforms the closed loop diversity scheme described in method 500 and/or vice versa. For example, communicating component 340 may determine signal-to-noise ratio (SNR) associated with the open loop diversity scheme (e.g., cyclic delay diversity (CDD), PMI cycling, etc.) and a SNR associated with the closed loop described above, and may select the one having the highest SNR, select one or the other based on comparing associated SNR(s) with associated threshold(s), etc.

In addition, for example, for 4-message PRACH between the UE 115 and base station 105, the UE 115 can send a RACH preamble as message 1, and a PUSCH on message 3. In this example, precoder deriving component 344 can determine a precoder (e.g., at Block 506) for the preamble transmission on the corresponding PRACH resources based on the measured uplink channel. Precoder deriving component 344 can determine a precoder (e.g., at Block 506) for the resources for message 1 and message 3 based on the measured uplink channel as well. With a 2-message PRACH, precoder deriving component 344 can determine a precoder (e.g., at Block 506) for the resources for message 1 based on the measured uplink channel. Moreover, for example, communicating component 340 may determine whether to switch to an open loop diversity scheme if it outperforms the closed loop diversity scheme described in method 500 for PRACH as well. For example, communicating component 340 may determine signal-to-noise ratio (SNR) associated with the open loop (e.g., cyclic delay diversity (CDD), PMI cycling, etc.) and a SNR associated with the closed loop described above, and may select the one having the highest SNR, select one or the other based on comparing associated SNR(s) with associated threshold(s), etc.

Referring to FIG. 6, a block diagram is shown that includes a portion of a wireless communications system 600 having a UE 115 in communication with a base station 105. For example, the base station can transmit downlink signaling 602, which the UE 115 can receive. The downlink signaling 602 may include or otherwise indicate a covariance matrix (e.g., as an explicitly indicated matrix, as a CSI-RS precoded based on the covariance matrix (e.g., and/or an associated whitening matrix), and/or the like). In another example, the downlink signaling 602 may include a CSI-RS, as described, precoded based on the covariance matrix or otherwise based on a precoder derived from a downlink channel obtained based on channel reciprocity with an uplink channel.

The UE 115 can determine a precoder at 604, where determining the precoder is based at least in part on the downlink signaling 602. As described, for example, the UE 115 can determine the precoder based at least in part on deriving the precoder based on the covariance matrix and/or based on a precoder used in transmitting the CSI-RS. In another example, UE 115 can determine the precoder based at least in part on obtaining the uplink channel (e.g., based on channel reciprocity with a downlink channel over which downlink signaling 602 is received), and/or determining conditions of the uplink channel. The UE 115 can optionally transmit uplink channel feedback 606 to the base station 105, which can include transmitting PMI, MCS, etc. based at least in part on the determined precoder, the covariance matrix, the precoded CSI-RS, etc. In addition, the PMI, MCS, etc. may correspond to parameters the UE 115 intends to use in transmitting uplink communications to the base station 105. In an example, the UE 115 can transmit the uplink channel feedback 606 over a control channel (e.g., PUCCH), over a shared data channel (e.g., PUSCH along with data), etc. Moreover, in an example as described, UE 115 may determine to switch to an open loop precoder in determining the precoder at 604, where the UE 115 determines that the open loop precoder outperforms the closed loop precoder as described (e.g., based on determining a SNR associated with the open loop precoder (e.g., cyclic delay diversity (CDD), PMI cycling, etc.) is higher (e.g., by a threshold) than an a SNR associated with the closed loop precoder.

Base station 105 can optionally transmit a precoder indication 608 to the UE 115 indicating whether the UE 115 is to use a precoder specified by the base station 105 or whether the UE 115 is to autonomously derive a precoder based on other parameters, such as based on the downlink signaling 602, as described. In one example, base station 105 can transmit the precoder indication 608 to the UE 115 based on the uplink channel feedback 606 (e.g., where the channel feedback achieves a threshold, base station 105 can allow the UE 115 to determine the precoder). In another example, base station 105 can transmit the precoder indication 608 based on the precoder indicated by the UE 115 (e.g., in the uplink channel feedback 606). In one example, the precoder indication 608 may explicitly indicate the precoder for the UE 115 to use in transmitting uplink communications to the base station 105.

In any case, the UE 115 can apply the specified or derived precoder at 610 for transmitting uplink communications. For example, the UE 115 can apply the precoder using a continuous precoding to allow the base station 105 to perform wideband channel estimation. In another example, the UE 115 can apply a different precoder for one or more different REs, RBs, PRBs, etc. over one or more symbols where OFDM is used (e.g., continuously changing the precoder over frequency resources of the REs, RBs, PRBs, etc. for at least a given time period), or may apply a single precoder where SC-FDM is used. In any case, the UE 115 can accordingly transmit the precoded uplink transmissions 612 to the base station 105. In one example, transmitting the precoded uplink transmission(s) 612 can include transmitting one or more PRACH messages to perform a PRACH procedure with the base station 105.

Additionally, in an example, in determining the precoder at 604, the UE 115 may determine whether to use closed-loop precoder determination, as described above, or an open-loop scheme (e.g., transmit antenna selection, SORTD, cyclic delay diversity, precoder cycling, etc.). For example, UE 115 can compare SNRs associated with the various schemes, as described above, in determining which precoder determination to use.

Figure 7:
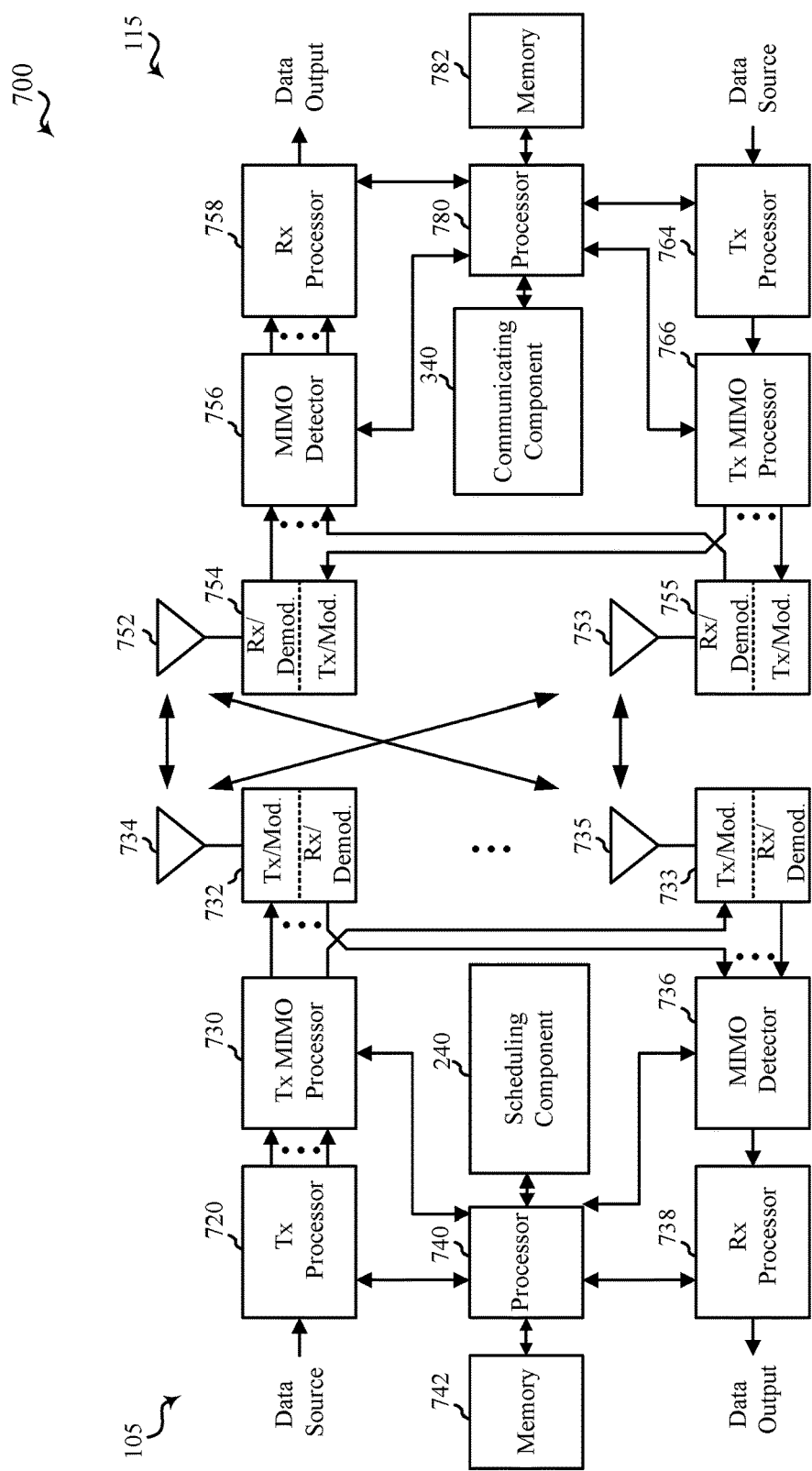
FIG. 7 is a block diagram illustrating an example of a MIMO communication system including a base station and a UE, in accordance with various aspects of the present disclosure.

FIG. 7 is a block diagram of a MIMO communication system 700 including a base station 105 and a UE 115. The MIMO communication system 700 may illustrate aspects of the wireless communication system 100 described with reference to FIG. 1. The base station 105 may be an example of aspects of the base station 105 described with reference to FIGS. 1 and 2. The base station 105 may be equipped with antennas 734 and 735, and the UE 115 may be equipped with antennas 752 and 753. In the MIMO communication system 700, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 115 may be an example of aspects of the UEs 115 described with reference to FIGS. 1 and 3. At the UE 115, the UE antennas 752 and 753 may receive the DL signals from the base station 105 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 115 to a data output, and provide decoded control information to a processor 780, or memory 782.

The processor 780 may in some cases execute stored instructions to instantiate a communicating component 340 (see e.g., FIGS. 1 and 3).

On the uplink (UL), at the UE 115, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 105 in accordance with the communication parameters received from the base station 105. At the base station 105, the UL signals from the UE 115 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a communicating component 340 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
   receiving downlink signaling from an access point;
   deriving, based at least in part on at least one of a covariance matrix or the downlink signaling, one or more precoders for uplink communications over an uplink channel;
   indicating, based at least in part on the one or more precoders, uplink channel feedback to the access point; and
   receiving, from the access point and in response to indicating the uplink channel feedback, a precoder indication to use the one or more precoders or one or more other precoders in transmitting uplink communications to the access point.

2. The method of claim 1, wherein indicating the uplink channel feedback includes indicating at least one of a modulation and coding scheme (MCS) or precoding matrix indicator (PMI) in the uplink channel feedback based at least in part on the one or more precoders.

3. The method of claim 1, wherein receiving the downlink signaling from the access point comprises receiving downlink signaling that is based on the covariance matrix, wherein the covariance matrix is on noise and interference experienced on the access point.

4. The method of claim 1, wherein receiving the precoder indication comprises receiving the precoder indication in at least one of an uplink grant or a radio resource control message from the access point.

5. The method of claim 1, further comprising transmitting uplink communications to the access point over the uplink channel based on at least one precoder of the one or more precoders or the one or more other precoders based at least in part on the precoder indication.

6. The method of claim 5, wherein transmitting the uplink communications comprises using the at least one precoder regardless of a precoding matrix indicator specified in the uplink channel feedback.

7. The method of claim 6, wherein the at least one precoder changes continuously over frequency resources of a set of physical resource blocks.

8. The method of claim 6, wherein the at least one precoder can be different on different resource elements, resource blocks, or physical resource blocks in different time periods.

9. The method of claim 1, wherein indicating the uplink channel feedback comprises transmitting the uplink channel feedback to the access point in an uplink control channel along with downlink channel feedback.

10. The method of claim 1, wherein indicating the uplink channel feedback comprises transmitting the uplink channel feedback to the access point in an uplink control channel separately from downlink channel feedback.

11. The method of claim 1, wherein indicating the uplink channel feedback comprises transmitting the uplink channel feedback to the access point in an uplink data channel.

12. The method of claim 1, further comprising:
    determining the uplink channel based at least in part on channel reciprocity with the downlink signaling, wherein deriving the one or more precoders is based at least in part on the uplink channel.

13. The method of claim 12, wherein the uplink channel is an uplink control channel or an uplink data channel, and further comprising:
    transmitting uplink communications over the uplink channel using different ones of the one or more precoders on different resource elements, resource blocks, or physical resource blocks.

14. The method of claim 12, further comprising comparing a first signal-to-noise ratio (SNR) associated with an open loop transmit diversity to a second SNR associated with determining the uplink channel based at least in part on channel reciprocity with the downlink signaling, and wherein determining the uplink channel based at least in part on channel reciprocity with the downlink signaling is based at least in part on the comparing.

15. The method of claim 12, further comprising transmitting at least one random access channel (RACH) message over the uplink channel using the one or more precoders.

16. A method for wireless communication, comprising:
    receiving an indication of uplink channel feedback from a user equipment (UE), wherein the uplink channel feedback corresponds to one or more downlink signals transmitted to the UE;
    determining, based on the uplink channel feedback, whether to specify one or more precoders for the UE or allow the UE to autonomously determine the one or more precoders; and
    indicating, to the UE, whether to use the one or more precoders or to autonomously determine the one or more precoders.

17. The method of claim 16, further comprising indicating a covariance matrix to the UE, wherein the uplink channel feedback additionally corresponds to the covariance matrix.

18. The method of claim 16, wherein the uplink channel feedback comprises at least one of a sounding reference signal (SRS), a modulation and coding scheme (MCS) or precoding matrix indicator (PMI) determined by the UE based on the one or more downlink signals transmitted to the UE.

19. The method of claim 16, wherein indicating, to the UE, to use the one or more precoders comprises indicating the one or more precoders to the UE.

20. The method of claim 16, further comprising receiving, in an uplink control channel from the UE, downlink channel feedback along with the uplink channel feedback.

21. The method of claim 16, further comprising receiving, in an uplink data channel from the UE, the uplink channel feedback.

22. An apparatus for wireless communication, comprising:
- a transceiver for communicating one or more wireless signals via one or more antennas;
- a memory configured to store instructions; and
- one or more processors communicatively coupled with the transceiver and the memory, wherein the one or more processors are configured to:
  - receive downlink signaling from an access point;
  - derive, based at least in part on at least one of a covariance matrix or the downlink signaling, one or more precoders for uplink communications over an uplink channel;
  - indicate, based at least in part on the one or more precoders, uplink channel feedback to the access point; and
  - receive, from the access point and in response to indicating the uplink channel feedback, a precoder indication to use the one or more precoders or one or more other precoders in transmitting uplink communications to the access point.

23. The apparatus of claim 22, wherein the one or more processors are configured to indicate the uplink channel feedback at least in part by indicating at least one of a modulation and coding scheme (MCS) or precoding matrix indicator (PMI) in the uplink channel feedback based at least in part on the one or more precoders.

24. The apparatus of claim 1, wherein the one or more processors are configured to receive the downlink signaling that is based on the covariance matrix, wherein the covariance matrix is on noise and interference experienced on the access point.

25. The apparatus of claim 22, wherein the one or more processors are further configured to transmit the uplink communications to the access point over the uplink channel based on at least one precoder of the one or more precoders.

26. The apparatus of claim 22, wherein the one or more processors are configured to indicate the uplink channel feedback at least in part by transmitting the uplink channel feedback to the access point in an uplink control channel along with downlink channel feedback.

27. The apparatus of claim 22, wherein the one or more processors are further configured to determine the uplink channel based at least in part on channel reciprocity with the downlink signaling, wherein the one or more processors are configured to derive the one or more precoders based at least in part on the uplink channel.

28. An apparatus for wireless communication, comprising:
- a transceiver for communicating one or more wireless signals via one or more antennas;
- a memory configured to store instructions; and
- one or more processors communicatively coupled with the transceiver and the memory, wherein the one or more processors are configured to:
  - receive an indication of uplink channel feedback from a user equipment (UE), wherein the uplink channel feedback corresponds to one or more downlink signals transmitted to the UE;
  - determine, based on the uplink channel feedback, whether to specify one or more precoders for the UE or allow the UE to autonomously determine the one or more precoders; and
  - indicate, to the UE, whether to use the one or more precoders or to autonomously determine the one or more precoders.

29. The apparatus of claim 28, wherein the one or more processors are further configured to indicate a covariance matrix to the UE, wherein the uplink channel feedback additionally corresponds to the covariance matrix.

30. The apparatus of claim 28, wherein the uplink channel feedback comprises at least one of a sounding reference signal (SRS), a modulation and coding scheme (MCS) or precoding matrix indicator (PMI) determined by the UE based on the one or more downlink signals transmitted to the UE.

* * * * *